United States Patent [19]
Baker et al.

[11] 4,193,645
[45] Mar. 18, 1980

[54] PLAIN BEARINGS

[75] Inventors: Dennis S. Baker, High Wycombe; Glyndwr J. Davies, London, both of England

[73] Assignee: Glacier Metal Company, Limited, Middlesex, United Kingdom

[21] Appl. No.: 950,052

[22] Filed: Oct. 10, 1978

Related U.S. Application Data

[60] Continuation of Ser. No. 736,337, Oct. 28, 1976, abandoned, which is a division of Ser. No. 620,754, Oct. 8, 1975, Pat. No. 4,015,949, which is a continuation of Ser. No. 402,334, Oct. 1, 1973, abandoned.

[30] Foreign Application Priority Data

Jun. 13, 1973 [GB] United Kingdom .............. 28054/73
Jul. 4, 1973 [GB] United Kingdom .............. 31969/73
Aug. 30, 1973 [GB] United Kingdom .............. 40801/73

[51] Int. Cl.² ............................................. F16C 9/00
[52] U.S. Cl. ............................... 308/23; 308/237 R; 308/DIG. 8; 428/419; 428/653

[58] Field of Search ................... 308/35, 36 R, 237 R, 308/238, 241, DIG. 5, DIG. 7, DIG. 8, DIG. 9, 23; 428/419, 461, 653; 252/12, 12.2

[56] References Cited

U.S. PATENT DOCUMENTS

| | | | |
|---|---|---|---|
| 2,788,324 | 4/1957 | Mitchell | 308/DIG. 7 |
| 3,652,327 | 3/1972 | Hill et al. | 428/461 |
| 3,909,087 | 9/1975 | Cairns | 308/238 |

*Primary Examiner*—Charles E. Frankfort
*Attorney, Agent, or Firm*—Oblon, Fisher, Spivak, McClelland & Maier

[57] ABSTRACT

This invention consists of a plain bearing in which the bearing surface consists of or includes poly-phenylene sulphide to give good bearing properties and also because such linings can be bonded to backings of steel or aluminium or aluminium alloys with a bond that withstands hard operating conditions, for example changes of temperature and changes of shape and stress. The linear polymer can be cross-linked to a desired extent by appropriate treatment.

2 Claims, No Drawings

PLAIN BEARINGS

This is a Continuation of Application Ser. No. 736,337, filed Oct. 28, 1976, now abandoned, which is a Division of Ser. No. 620,754, filed Oct. 8, 1975, now U.S. Pat. No. 4,015,949, which is in turn a Continuation of Ser. No. 402,334, filed Oct. 1, 1973, now abandoned.

This invention relates to plain bearings and methods of making them, and more particularly to a plain bearing having a bearing lining consisting of polyphenylene sulphide. Poly-phenylene sulphide is a crystalline material prepared by the reaction of p-dichlorobenzene with sodium sulphide in a polar solvent. The linear polymer so formed, initially, as characterized by only fair mechanical strength. Upon heat curing in air, however, it is cross-linked into a tough, ductile, and extemely insoluble material. In this specification the term polyphenylene sulphide includes polymers of varying degrees of cross-linking which can be produced depending upon the, heat treatment used.

Preferably, the bearing has a metal backing which is composed of, for example steel, aluminium, or an aluminium alloy. When the backing is made of steel, the upper surface of the backing can be aluminized, or can have bonded to it, possibly by roll-bonding, a strip of aluminium foil, since polyphenylene sulphide will adhere more readily to aluminium or to an aluminium alloy. Manganese dioxide, or lead oxide, may be mixed with the poly-phenylene sulphide to assist cross-linking and to effect oxidation of the backing surface to improve the bond between the polyphenylene sulphide and the backing. Alternatively, or in addition thereto, titanium dioxide can be added to improve the adhesion of the poly-phenylene sulphide to the backing.

The bearing may be for wet or dry use, that is to say, it may be arranged to operate with oil, grease, or other appropriate lubricant. When made for wet uses, lubricant pockets can be provided in the lining, possibly by indenting into the backing, and can be charged with sufficient lubricant to last the life of the bearing. Alternatively, the bearings may be used as so called dry bearings by including polytetrafluoroethylene with the poly-phenylene sulphide layer.

The poly-phenylene sulphide may include fillers for improving the mechanical properties or the lubricating properties, for example, copper, or bronze powders, asbestos, molybdenum disulphide, lead powder, lead oxide powder, cadmium, nickel, cobalt, or boron nitride.

From another aspect the invention may be considered to reside in a plain bearing having an overlay.

A soft overlay is often applied to the bearing surface of plain bearings, such as when the bearings are intended for use in a crankshaft bearing of an internal combustion engine. Such an overlay may be applied by electrodeposition of such alloys as lead/tin, lead/tin/copper or lead/indium. The function of the overlay is to improve the seizure resistance of the bearing, to embed dirt particles carried by the lubricating oil, and, in some cases, to provide protection for the bearing against corrosion by the oil. The function of the tin or indium content in the overlay is to make the overlay itself resistant to corrosion. The thickness of the overlay must also be closely controlled, usually within the limits of ±0.01 mm.

Overlay plating is used on a range of bearing materials of the kind where there is a steel back, an intermediate alloy layer of copper/lead, lead/bronze, aluminium/tin or aluminium/silicon, and an overlay over this intermediate layer. Preparation of the intermediate alloy surface, prior to electrodeposition of the overlay, is a multistage process involving one or more chemical etching stages, and, in the case, of the aluminium alloys, the electrodeposition of a tin interlayer of nickel or copper. The electrodeposition of overlays is thus a complex process requiring close control; it is for this reason a costly process which accounts for a significant proportion of the control cost of the bearing.

The common electrodeposited overlays have a further disadvantage in that during operating at high temperatures as might be experienced when the bearing is used in internal combustion engines, the loss of tin or indium by diffusion into the intermediate alloy or into the nickel or copper interlayer can take place. When the overlay becomes denuded of tin or indium the overlay becomes subject to corrosion by the engine oil. Corrosion can result in severe cases in the partial or complete disappearance of the overlay.

A layer of poly-phenylene sulphide may be applied over such a plain bearing as a protective overlay.

The invention relates to all kinds of plain bearings whether thrust or journal bearings, including plain shell bearings, for such applications as engine shaft bearings, and also plain bearings consisting of flat relatively slidable metal surfaces of which many examples occur in the world of engineering. A journal bearing shell can be made by coating a flat strip with poly-phenylene sulphide and then forming the strip into a part cylindrical shell.

The poly-phenylene sulphide may be applied to the backing possibly in powder form, or possibly in the form of a thin sheet, or possibly by spraying, for example, electro-static spraying, spraying in solution, plasma or flame spraying or even by application from a fluidised bed.

The bonding to the backing can be simply effected by heating the lining material and backing or overlay sufficiently to melt the lining material, and continuing heat treatment until a good bond is achieved. For example, in bonding polyphenylene sulphide to an aluminium alloy, such as, a magnesium/aluminium, silicon/aluminium or tin/aluminium alloy, the resin is heated to at least 370° C. in air for at least 10 minutes. Alternatively bonding can be effected by a rolling process and indeed a rolling process can also be used to form indentations in the lining to define the lubricant pockets discussed above.

Heat treatment of the poly-phenylene sulphide can cause an increased degree of cross-linking of the polymer which can improve its mechanical properties.

In general, the poly-phenylene sulphide layer will not soften in use at temperatures below 270° C. which is adequate as a bearing surface operating temperature for very many applications.

The bearing can be bonded, formed and cured in operations which produce quite severe deformations in the plastic/metal laminate without failure of the bond and without loss of manufacturing tolerance, and that makes the poly-phenylene sulphide particularly suitable for the type of bearing which requires such formation.

Another method of keying the poly-phenylene sulphide to the backing is by causing the layer of metal powder to adhere to the backing, and then impregnating it with the poly-phenylene sulphide, for example, by rolling. As poly-phenylene sulphide is dimensionally stable it is possible to form bearings of the final size in that manner but it is possible to machine the bearing to the final size for example by boring.

Also where a particular thickness of poly-phenylene sulphide is required it may be built up in one or more layers.

The invention may be carried into practice in various ways and some examples will now be described.

EXAMPLE I

A 1 mm thick strip of an alloy of 4.0 to 4.9% magnesium by weight, 0.5 to 1.0% manganese, with the balance aluminium, is brushed under a rotating wire brush and has applied to it poly-phenylene sulphide powder with a particle size in the range 90 to 350 microns, the powder having been lightly cross-linked by heat treatment in air. The powder is spread by a reciprocating blade to a thickness of 2 mm and is then melted by heating at 300° C. from the aluminium alloy side. Then the melted layer is transferred to an oven and cured for one hour at 375° C. achieving a final layer thickness in the range 0.3 to 0.4 mm. Bearing brushes are formed from such a strip blank.

EXAMPLE II

A low carbon steel strip 1.5 mm thick is linished and has bonded to it a brushed commercially pure aluminium foil 0.1 mm thick and bonding is effected by rolling with 43% reduction. The upper aluminium surface is brushed and then the lining is applied to it by the method described in Example I. In either case the temperature at which the finished bearing begins to distort can be raised by a long curing step, for example curing at 375° C. for 16 hours.

EXAMPLE III

This method is the same as in Example I except that after the polymer has melted the strip is cooled rapidly and formed into a bush which is then heated at 375° C. for one hour.

EXAMPLE IV

This method is the same as Example III except that instead of cooling the strip rapidly the following heat treating cycle is followed: heating for one minute between 300° and 375° C., holding for five minutes at 375° C., and heating for 15 minutes at 375° to 440° C.

EXAMPLE V

This is the same as Example I except that the strip is a 1 mm thick strip of an alloy consisting of 0.8 to 1.5% manganese by weight with the balance being aluminium. After curing the strip is passed under an indenting roll to give a pattern of 2 mm by 1 mm rectangular indents 0.4 mm deep. The blank is formed into part-cylindrical portions with the indents extending axially and the indents are filled with grease prior to use.

EXAMPLE VI

This is the same as Example V up to identation, after which a blank is rolled in low molecular weight polyethylene wax and formed into a bush.

EXAMPLE VII

A drawn tube 30 mm inside diameter and 35 mm outside diameter and 50 mm long of an alloy consisting of 3.1 to 3.9% magnesium by weight with the balance being aluminium is degreased and heated to 520° C. It is then dipped into a fluidised bed of lightly cross-linked poly-phenylene sulphide powder which melts on the surface. Unmelted powder is removed by blowing or sucking and the coated tube transferred to an oven at 310° C. The temperature is raised to 375° C. for one hour and the tube is machined to final size.

EXAMPLE VIII

A shell consisting of a 60% aluminium/40% tin alloy has its surface brushed and applied to a cleaned surface of a steel backing. The backing and lining are heated to 400° C. and then treated as in Example VII.

EXAMPLE IX

Poly-phenylene sulphide powder which is not cross-linked is mixed with DQ3 powder in a high speed mixer in equal proportions, and spread by a reciprocating blade in a layer 1 mm thick on a brushed surface of a 1 mm thick strip of alloy consisting of 4.0 to 4.9% magnesium, 0.5 to 1.0% manganese, the balance being aluminium. The powder is melted at 300° C. by heating from the aluminium side and consolidation bonding is effected with a cooled roll after which the blank is cured for one hour at 375° C. cooled and formed into a bush.

EXAMPLE X 75 parts of poly-phenylene sulphide powder not cross-linked is melted and combined with 25 parts of DQ3 powder and comminuted to a particle size between 90 and 350 microns and it is then applied to a strip as in Example VII.

In the above two examples, DQ3 powder consists of:

| | |
|---|---|
| PTFE | 26.8% by weight: |
| $Pb_3O_4$ | 65.0% |
| $PbO_2$ | 3.7% |
| Tin/Bronze powder | 4.5% |

EXAMPLE XI

This is the same as Example VIII but applied to an alloy consists of 10.3% to 11% silicon, 0.9% to 11% copper, the balance being aluminium.

In the examples a temperature of 375° C. has been referred to. In fact the temperature and time of treatment can be varied in accordance with requirements between about 316° C. for three hours and about 427° C. for 10 minutes.

What we claim as our invention and desire to secure by Letters Patent is:

1. In a plain bearing for use in an internal combustion engine, which is lubricated with a lubricant consisting of an oil, the improvement which comprises a steel backing having adhered thereto a soft bearing layer of an alloy selected from the group consisting of copper/lead, lead/bronze, aluminum/tin and aluminum/silicon, and having adherent on said bearing layer a protective overlay of polyphenylene sulfide.

2. In a plain bearing for use in an internal combustion engine, which is lubricated with a lubricant consisting of an oil, the improvement which comprises a steel backing having adhered thereto a soft non-porous bearing layer of an alloy selected from the group consisting of copper/lead, lead/bronze, aluminum/tin and aluminum silicon, and having adherent on said bearing layer a protective overlay of polyphenylene sulfide.

* * * * *